United States Patent [19]
Chiotis et al.

[11] Patent Number: 5,529,508
[45] Date of Patent: Jun. 25, 1996

[54] SEALING MEMBER

[75] Inventors: Achilles Chiotis, Mountain View; Dave Perkins, Union City; John M. Blum, Los Gatos, all of Calif.

[73] Assignee: Raychem Corporation, Menlo Park, Calif.

[21] Appl. No.: 221,728

[22] Filed: Apr. 1, 1994

[51] Int. Cl.[6] .................................................. H01R 4/60
[52] U.S. Cl. ........................... 439/204; 439/589; 439/936
[58] Field of Search ................................. 439/201, 204, 439/205, 206, 263, 278, 279, 587–589, 730, 936

[56] References Cited

U.S. PATENT DOCUMENTS

| | | | |
|---|---|---|---|
| 3,138,657 | 6/1964 | Wengen | 174/92 |
| 4,600,261 | 7/1986 | Debbaut . | |
| 4,662,692 | 5/1987 | Uken et al. . | |
| 4,690,831 | 9/1987 | Uken et al. | 427/44 |
| 4,716,183 | 12/1987 | Gamarra et al. | 522/80 |
| 4,777,063 | 10/1988 | Dubrow et al. | 427/44 |
| 4,864,725 | 9/1989 | Debbaut | 29/871 |
| 4,865,905 | 9/1989 | Uken | 428/220 |
| 4,875,870 | 10/1989 | Hardy et al. | 439/204 |
| 4,927,386 | 5/1990 | Neuroth | 439/201 |
| 5,079,300 | 1/1992 | Dubrow et al. | 525/106 |
| 5,194,021 | 3/1993 | Oba et al. | 439/589 |

FOREIGN PATENT DOCUMENTS

| | | |
|---|---|---|
| 108518 | 5/1984 | European Pat. Off. . |
| 299797 | 1/1989 | European Pat. Off. . |
| WO86/01634 | 3/1986 | WIPO . |
| WO88/00603 | 1/1988 | WIPO . |
| WO92/05603 | 4/1992 | WIPO . |

OTHER PUBLICATIONS

International Publication No. WO90/05401.
International Publication No. WO91/13109.
International Search Report for International Application No. PCT/US95/01235.

*Primary Examiner*—Khiem Nguyen
*Attorney, Agent, or Firm*—Herbert G. Burkard; Sheri M. Novack

[57] ABSTRACT

A self supporting sealing member having a layer of sealant positioned longitudinally between two constraining layers. The lateral dimensions of the sealing member are designed to fit within a hollow member. The constraining layer is preferably a gel having a Voland hardness greater than the Voland hardness of the sealant. This configuration does not allow particles to contaminate the connection of substrates or wires inserted through the sealing member.

20 Claims, 1 Drawing Sheet

SEALING MEMBER

FIELD OF THE INVENTION

The present invention relates to a sealing member and an assembly for sealing a hollow member.

BACKGROUND OF THE INVENTION

Known prior art methods of sealing wires and/or contact pins include the use of grommets or other similar compression seals, and the use of heat shrinkable sealing sleeves. Other prior art methods use articles containing grease. However, greases lack any type of structural network, and this results in the greases generally being viscous and flowing when subjected to temperature cycling, thereby providing a relatively unstable means for protecting the pins and/or wires. Epoxies and other adhesives have also been used, but they are also disadvantageous in that reentry is difficult.

Gel grommets are an effective method of sealing close center-to-center spaced connectors. A single sealing member may be employed in an application for which the number of connections is not known prior to its selection. For example, such a connector design may be employed to seal the connectors for various "options" in an automobile. At the time of selection of the sealing member, the number of options the end purchaser will select is unknown. For this reason, and also to simplify production, it is not desirable to require different sealing members based upon the number of options selected.

U.S. application Ser. No. 07/762,533 to Collins et al, entitled "Sealing Member and Methods of Sealing," having a common inventor with the present application and assigned to the assignee of the present invention, which is hereby completely incorporated by reference for all purposes, discloses a gel grommet having a layer of gel disposed between two constraining layers. The constraining layers are preferably a compressible foam which accommodates volume changes of the gel. Such gel grommets are cost-effective, re-enterable and enable miniaturization, and thus provide a competitive advantage in the automotive marketplace. However, particles from the material of the constraining layers may become lodged between the contacts during insertion or removal, causing interference with the connection.

SUMMARY OF THE INVENTION

We have developed a self supporting sealing member which does not allow particles to contaminate the connection of substrates or wires inserted therethrough. The sealing member of the present invention also provides lowered insertion forces and superior sealing and aging performance, including sealing at temperatures of up to 155° C.

One aspect of this invention comprises an assembly for sealing an open end of a hollow member having an inner surface and at least one substrate extending into the hollow member through said open end, which assembly comprises:

a) a self supporting sealing member which comprises a layer of sealant positioned between two constraining layers and positioned such that the sealant layer and constraining layers extend transversely across the open end of the hollow member; and b) a force applying member to move the layers, including the sealing layer, into sealing contact with the inner surface of the hollow member;

wherein at least one of said constraining layers is sufficiently resilient to accommodate the displacement of sealant as the substrate passes through the sealant layer and wherein the constraining layer comprises a gel having a Voland hardness greater than the Voland hardness of the sealant layer.

Another aspect of the invention comprises a preformed sealing member comprising a self supporting article having at least one layer of sealant positioned between two constraining layers, and wherein at least one of the constraining layers comprises a gel including a reinforcing sheet. The reinforcing sheet may be a matrix, preferably a fabric matrix, impregnated with the layer of gel.

DETAILED DESCRIPTION OF THE PREFERRED EMBODIMENT

Figure 1:
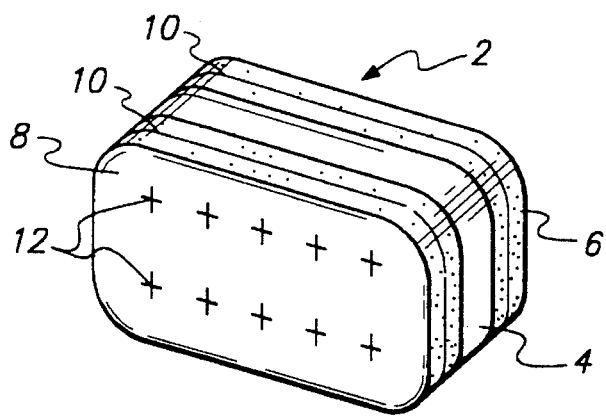
FIG. 1 illustrates a sealing member constructed in accordance with the present invention.

In accordance with the preferred embodiment of this invention, the open end of a hollow member is sealed using a sealing member comprising a layer of sealant between two constraining layers. Preferably the sealing member comprises, and may consist essentially of, a sandwich structure including one layer of sealant positioned between two constraining layers. The sealing member can also comprise, and may consist essentially of, three or more constraining layers and two or more layers of sealant, with a layer of sealant between each adjacent pair of constraining layers. In use, the sealing member in the illustrated embodiment is placed so that it is within the hollow member and extends transversely across its open end. Force is applied to the layers to maintain the sealant in sealing contact with the inner surface of the hollow member. In certain embodiments, at least one of the constraining layers is of a resilient material, preferably a hard gel, which accommodates volume changes of the sealant. The hard gel has a Voland hardness greater than the Voland hardness of the layer of sealant. The hard gel may also be reinforced by a sheet, preferably a matrix of fabric. The matrix serves to improve the mechanical properties, such as tensile strength and modulus of elasticity.

The hollow member can be, for example, a plug or cap, a pipe, an electrical housing, such as a connector body, or the like. The invention is particularly useful to seal the opening of a multiconductor connector body, as described more fully below.

Each constraining layer is generally a plate or disk of approximately the same dimensions and configuration as the hollow member with which it is to be used. The constraining layers serve to constrain the sealant from moving or being displaced from the sealant layer, for example when a substrate or wire is inserted through the sealant layer into the hollow member. The constraining layers may be the same or different. One constraining layer, preferably the constraining layer through which the substrate is inserted first, is made from a material having a Voland hardness greater than the Voland hardness of the layer of sealant. Preferably, this constraining layer is made from a hard gel or a hard gel including a reinforcing sheet. The reinforcing sheet may be a film or a matrix of, for example, foam or fabric. A fabric matrix may be a single layer or a plurality of layers. The other constraining layer may be a hard gel, compressible foam, plastic or other material. The present invention may also be employed to seal an interface in which no substrates are inserted through the sealing member.

In embodiments of the invention in which a substrate passes through the layers of the sealing member, the constraining layers should be constructed of a material through which the substrate can readily pass. Additionally or alternatively, the sealing member may include slits or holes to provide entry/exit sites for the substrates at the location at which the substrate is to be inserted. The size of the slit or hole should be smaller than the substrate to be inserted therethrough so that the sealant will effectively seal around the substrates. The number of holes or slits generally is equal to the greatest possible number of substrates to be inserted into the hollow member through the sealing member. In this way, the force required to insert the substrate through the sealing member is minimized.

Figure 3:
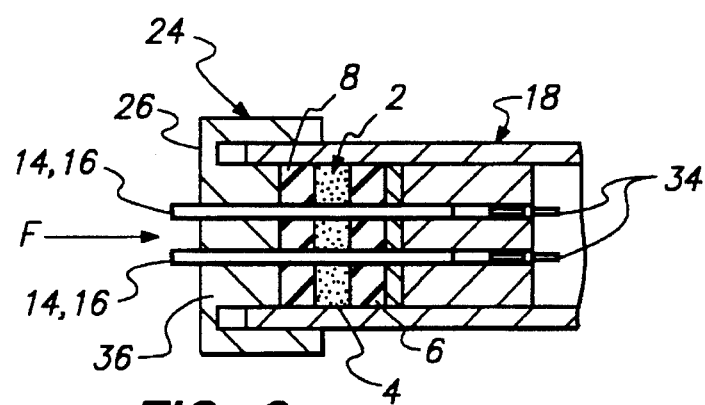
FIG. 3 is a cross-sectional view of an end of the multiconductor connector constructed in accordance with the present invention.

The layer of sealant may be a sealing material such as a grease or a gel. A preferred sealant is a gel. The gel preferably has a Voland hardness of about 1 to about 50 g, more preferably about 5 to about 25 g, and most preferably about 6 to about 20 g, and has an ultimate elongation of at least about 50%, preferably at least about 100%, more preferably at least about 400%, and particularly at least about 1500%. The elongation is measured according to the procedures of ASTM D217. The Voland hardness, stress relaxation and tack are measured using a Voland-Stevens Texture analyser Model LFRA having a 1000 g load cell, a 5 gram trigger, and a ¼ inch (6.35 mm) ball probe, as described in U.S. Pat. No. 5,079,300 to Uken, the disclosure of which is completely incorporated herein by reference for all purposes. For measuring the hardness of a gel a 20 ml glass scintillating vial containing 10 g of gel is placed in the Voland-Stevens Texture analyser and the stainless steel ball probe is forced into the gel at a speed of 0.20 mm a second to a penetration distance of 4.0 mm. The Voland hardness value of the gel is the force in grams required to force the ball probe at that speed to penetrate or deform the surface of the gel the specified 4.0 mm. The Voland hardness of a particular gel may be directly correlated to the ASTM D217 cone penetration hardness and the procedure and a correlation as shown in FIG. 3 of U.S. Pat. No. 4,852,646 to Dittmer et al, the disclosure of which is incorporated herein by reference for all purposes.

The gel sealant is preferably a fluid-extended polymer composition. The polymeric component can be for example, a silicone, polyorgano siloxane, polyurethane, polyurea, styrene-butadiene, styrene-isoprene, styrene-ethylene propylene-styrene, and/or styrene-ethylene butylene-styrene block copolymers. The gels may be formed from a mixture of such polymers. The layer of gel may comprise a foam impregnated with the gel. Examples of gels can be found in U.S. Pat. Nos. 4,600,261 to Debbaut; 4,690,831 to Uken et al; 4,716,183 to Gamarra et al; 4,777,063 to Dubrow et al; 4,864,725 to Debbaut et al; and 4,865,905 to Uken; and International published patent applications Nos. 86/01634 to Toy et al, and WO 88/00603 to Francis et al and commonly assigned copending U.S. applications Ser. Nos. 317,703 filed Mar. 1, 1989 to Dubrow et al and 485,686 filed Feb. 27, 1990 to Rinde et al. The entire disclosures of the above are incorporated herein by reference for all purposes. The gel may be impregnated in a reinforcing sheet such as a film or a matrix such as a foam or fabric. Gel impregnated in a matrix is disclosed in U.S. Pat. No. 4,865,905 to Uken. The entire disclosures of all of the above are incorporated herein by reference for all purposes.

In a preferred embodiment, the sealing member is preformed and is a self supporting member comprising a layer of sealant positioned between two constraining layers. A self supporting sealing member is one which does not require external structural support to maintain its configuration. In the preferred embodiment, each of the constraining layers is constructed of a gel having a Voland hardness greater than the Voland hardness of the sealant. The constraining layers may be the same or different and may be a hard gel alone, or may include a reinforcing sheet such as a matrix of fabric or other material. A hard gel is defined herein as a gel having a Voland hardness of between 75 and 350 g. The hard gel preferably has tack of between about 0 and 15 g, and most preferably about 1 g and stress relaxation of between about 1% and 20%, and most preferably about 10%. The hard gel may be as described in U.S. Pat. No. 5,079,300 to Uken, which has been incorporated herein by reference.

The sealing member can be prepared by placing a constraining layer on each side of a layer of sealant. A constraining layer including a reinforcing sheet is constructed by immersing the sheet into a bath of liquid raw materials and then curing, thereby resulting in a hard gel which is reinforced by a sheet.

In use, the sealing member is placed across the hollow member to be sealed, with the layers being positioned transversely across the member. The sealing member is preferably positioned at an open end of the hollow member. Force is applied, at least initially, to engage the sealing member in sealing contact with the inner surface of the hollow member and/or the substrate. The force can be applied, for example, by placing an appropriately configured cap over the hollow member. Preferably, the assembled structure retains at least a partial residual pressure on the gel sealant to assist with sealing during thermal cycling and/or under a water head. This may be accomplished when at least one of the constraining layers and/or the force applying member to the layers is capable of accommodating a change in volume of the sealant brought about by, for example, temperature variations or passing one or more substrates through the layers. The force applying member can be static or dynamic, e.g., the cap after engagement with the hollow member will be static while the resilient constraining layer(s) will be dynamic.

The force may be applied prior to insertion of a substrate through the slit or hole. A force, applied at least initially, prior to sealing, is required to allow the sealant, to move around and seal to the substrate. In addition, the substrate can be removed, and the sealant will move and re-seal the empty cavity. We believe a force is required initially for the sealing member so as to provide an effective seal.

Figure 2:
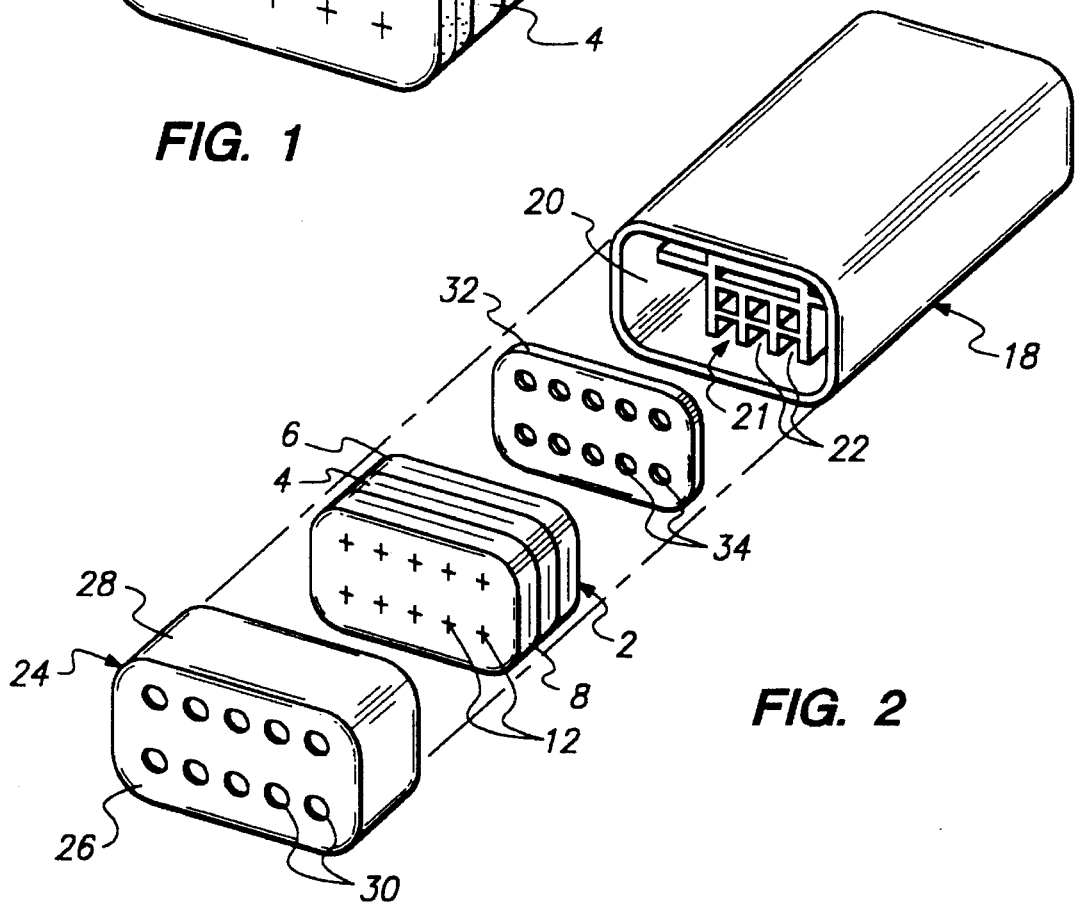
FIG. 2 is an exploded view of a multiconductor connector constructed in accordance with this invention.

Referring now to the Figures, FIG. 1 illustrates a self supporting sealing member 2 having a layer of gel sealant 4 positioned between two layers of constraining material 6, 8. In the preferred embodiment, constraining layers 6, 8 are constructed of a hard gel including a reinforcing sheet 10. As shown in FIGS. 2 and 3, the hard gel need not be reinforced. Layers 4, 6, 8 may include slits or openings 12 are precut through the entire sealing member 2 for ease of insertion of substrates 14, 16, as seen in FIG. 3.

FIG. 2. shows a hollow member or connector body 18 which can be sealed in accordance with the present invention. Connector body 18 comprises sides 20 extending longitudinally to form a hollow open end 21 of the connector body. Connector body 18 also includes plurality of holes 22 for receiving substrates 14, 16.

Cover 24 comprises base 26 and sides 28 and has a plurality of holes 30 corresponding to the holes in connector body 18. The cover can act as the force applying member when pushed onto connector body 18. Plate 32 in conjunction with cover 24 defines a cavity for receiving sealing member 2. Holes 34 of plate 32 correspond to holes 22 in connector body 18, holes 30 in cover 24 and holes 12 in sealing member 2. Plate 32 is not required, but may be constructed as a part of connector body 18. Connector body 18 has means for securing the cover to the connector body, for example, cover 24 may snap in place to be retained by connector body 18, as described in U.S. application Ser. No. 07/762,533 of Collins, which has been incorporated herein by reference. It should be noted that any securing mechanism can be employed.

As described above, sealant layer 4 is preferably a gel which must be contained and placed under pressure, at least initially, to create a seal. The edges of sealing member 2 must be fully contained within open end 21 of connector body 18 by sides 20.

FIG. 3 shows in cross-section the sealed open end of the multiconductor assembly of FIG. 2. When sealing member 2 is assembled within open end 21 of connector body 18 and placed under pressure by forcing cover 24 onto the back of the connector body at open end 21 to seal the unit with or without wires. In FIG. 3, substrates 14, 16, including terminals 34 are shown inserted through sealing member 2 and sealant layer 4 and locked in place. Cover 24 is positioned over open end 21 of connector body 18. Base 26 of cover 24 includes a raised portion 36 for applying a force to sealing member 2. The force is indicated by arrow F in FIG. 3. The hard gel of constraining layers 6, 8 is compressed by the application of force F. Sealant layer 4 will move around and seal to substrates 14, 16. The hard gel is sufficiently resilient to accommodate the volume change in the sealant layer 4 as terminals 34 followed by substrates 14, 16 are inserted into the multiconductor connector. It should be noted that the substrates, including terminals can be repeatedly removed and reinserted through constraining layers 6, 8 and sealant layer 4, the constraining layers and sealant layer being sufficiently resilient to accommodate the repeated volume change. Sealant layer 4 will move and reseal the empty cavity between cover 24 and plate 32.

Variations and modifications can be made to the preferred embodiment without departing from the scope of the present invention, which is limited only by the following claims.

What is claimed is:

1. An assembly for sealing an open end of a hollow member having an inner surface and at least one substrate extending into the hollow member through said open end, which assembly comprises:
   a) a self supporting sealing member which comprises a layer of sealant positioned between two constraining layers and positioned such that the sealant layer and the constraining layers extend transversely across the open end of the hollow member; and
   b) a force applying member to move the constraining layers and the layer of sealant into sealing contact with the inner surface of the hollow member;
wherein at least one of said constraining layers is sufficiently resilient to accommodate displacement of sealant as a substrate passes through the sealant layer and wherein the constraining layer comprises a gel having a Voland hardness greater than the Voland hardness of the sealant layer.

2. An assembly as defined in claim 1 wherein the Voland hardness of the constraining layer is between 75 g and 350 g.

3. An assembly as defined in claim 2 wherein the Voland hardness of the constraining layer is between 100 g and 300 g.

4. An assembly as defined in claim 3 wherein the Voland hardness of the layer of sealant is between 5 and 25 g and the Voland hardness of the constraining layer is between 75 and 350 g.

5. An assembly as defined in claim 1 wherein the constraining layer includes a reinforcing sheet.

6. An assembly as defined in claim 5 wherein the reinforcing sheet comprises a matrix.

7. An assembly as defined in claim 6 wherein the matrix comprises at least one layer of fabric.

8. An assembly as defined in claim 7 wherein said matrix comprises a plurality of layers of fabric.

9. An assembly as defined in claim 1 wherein the outer surface of the constraining layer is tacky to the touch.

10. An assembly as defined in claim 1 wherein the at least two constraining layers are identical.

11. An assembly as defined in claim 1 further comprising a plurality of layers of sealant each positioned between two constraining layers, thereby forming a multi-layered sandwich configuration.

12. An assembly as defined in claim 1 wherein the force applying member is a cover.

13. A preformed sealing member comprising a self supporting member having at least one layer of sealant positioned between two constraining layers, wherein at least one of the constraining layers comprises a gel including a reinforcing sheet.

14. A preformed sealing member as defined in claim 13 wherein the reinforcing sheet comprises a matrix impregnated by the gel.

15. A preformed sealing member as defined in claim 14 wherein the matrix comprises at least one layer of fabric.

16. A preformed sealing member as defined in claim 15 wherein the fabric matrix is a plurality of fabric layers.

17. A preformed sealing member as defined in claim 13 wherein the Voland hardness of the constraining layer is greater than the Voland hardness of the sealant layer.

18. A preformed sealing member as defined in claim 17 wherein the Voland hardness of the constraining layer is between 75 g and 350 g and the Voland hardness of the layer of sealant is between 5 and 25 g.

19. An assembly for sealing an open end of a hollow member having an inner surface, which assembly comprises:
   a) a self supporting sealing member which comprises a layer of sealant positioned between two constraining layers and positioned such that the sealant layer and the constraining layers extend transversely across the open end of the hollow member; and
   b) a force applying member to move the constraining layers and the layer of sealant into sealing contact with the inner surface of the hollow member;
wherein at least one of said constraining layers is sufficiently resilient to accommodate displacement of sealant as the force is applied and wherein the constraining layer comprises a gel having a Voland hardness greater than the Voland hardness of the sealant layer.

20. The assembly as defined in claim 19 wherein the Voland hardness of the layer of sealant is between 5 and 25 g and the Voland hardness of the constraining layer is between 75 and 350.

* * * * *